United States Patent
Ishii et al.

(10) Patent No.: US 8,000,300 B2
(45) Date of Patent: Aug. 16, 2011

(54) MOBILE STATION, RADIO ACCESS NETWORK APPARATUS AND MOBILITY CONTROL METHOD

(75) Inventors: Minami Ishii, Yokohama (JP); Sadayuki Abeta, Yokohama (JP); Takehiro Nakamura, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 2 days.

(21) Appl. No.: 12/278,931

(22) PCT Filed: Feb. 13, 2007

(86) PCT No.: PCT/JP2007/052501
§ 371 (c)(1),
(2), (4) Date: Nov. 4, 2008

(87) PCT Pub. No.: WO2007/094309
PCT Pub. Date: Aug. 23, 2007

(65) Prior Publication Data
US 2010/0188985 A1    Jul. 29, 2010

(30) Foreign Application Priority Data
Feb. 14, 2006   (JP) .................. 2006-037288

(51) Int. Cl.
*H04W 4/00* (2009.01)

(52) U.S. Cl. .................. 370/331; 455/437; 455/444

(58) Field of Classification Search .................. 370/331, 370/332, 333, 342, 329, 252; 455/423, 437, 455/442, 67.1
See application file for complete search history.

(56) References Cited

U.S. PATENT DOCUMENTS

| | | |
|---|---|---|
| 5,722,072 A | 2/1998 | Crichton et al. |
| 2006/0009158 A1 | 1/2006 | Bernhard et al. |

(Continued)

FOREIGN PATENT DOCUMENTS

CN    1120790 A    4/1996

(Continued)

OTHER PUBLICATIONS

International Search Report w/translation from PCT/JP2007/052501 dated May 15, 2007 (6 pages).

(Continued)

*Primary Examiner* — Dmitry H. Levitan
*Assistant Examiner* — Dady Chery
(74) *Attorney, Agent, or Firm* — Osha • Liang LLP

(57) ABSTRACT

A mobile station includes a radio channel condition evaluation unit evaluating a radio channel condition; a radio channel condition averaging unit averaging the evaluated radio channel condition over a predefined time period; a radio channel condition threshold storage unit storing a threshold of the radio channel condition and a message type, the threshold and the message type being specified by a radio access network apparatus; a radio channel condition comparison unit comparing the averaged radio channel condition with the threshold; and a radio channel condition reporting unit transmitting an identifier and the radio channel condition for a cell to the radio access network apparatus, the averaged radio channel condition of the cell being greater than or equal to the threshold. A radio access network apparatus includes a radio channel condition threshold reporting unit transmitting a threshold of a reception level and information indicative of a reporting message type; a communicating cell switch unit instructing a communicating cell to be switched based on a radio channel condition supplied from a mobile station; and a mobile station identifier reporting unit transmitting a mobile station identifier for use in a destination cell based on the radio channel condition supplied from the mobile station.

8 Claims, 6 Drawing Sheets

U.S. PATENT DOCUMENTS

2007/0026810 A1* 2/2007 Love et al. .................. 455/67.11
2009/0168662 A1* 7/2009 Tsuboi et al. ................. 370/252

FOREIGN PATENT DOCUMENTS

| CN | 1291413 A | 4/2001 |
|---|---|---|
| JP | 06-350518 A | 12/1994 |
| JP | 09-200838 A | 7/1997 |
| JP | 2002-504792 A | 2/2002 |
| JP | 2003-273792 A | 9/2003 |
| JP | 2003-348643 A | 12/2003 |
| JP | 2004-349976 A | 12/2004 |
| JP | 2006-025432 A | 1/2006 |
| WO | 9943178 A1 | 8/1999 |
| WO | 2004-057887 A1 | 7/2004 |

OTHER PUBLICATIONS

Written Opinion from PCT/JP2007/052501 dated May 15, 2007 (3 pages).

"UTRAN functions, examples on signalling procedures"; 3GPP TR 25.931 V6.2.0; Jun. 2005 (122 pages).

Taiwanese Office Action for Application No. 096105507, mailed on Apr. 19, 2010 (7 pages).

esp@cenet Patent Abstract for Chinese Publication No. 1120790, publication date Apr. 17, 1996. (1 page).

esp@cenet Patent Abstract for Chinese Publication No. 1291413, publication date Apr. 11, 2001. (1 page).

* cited by examiner

FIG.3

| CELL GROUP | CELL NUMBER | REPORTING THRESHOLD | REPORTING MESSAGE TYPE |
|---|---|---|---|
| 0 | 0 | 2dB | CQI Report |
|   | 1 |   |   |
|   | 2 |   |   |
| 1 | 3 | 3dB | RRC Message |
|   | 4 |   |   |
|   | 5 |   |   |

FIG.4A

| CELL 1 | CQI FOR CELL 1 | CELL 2 | CQI FOR CELL 2 |
|---|---|---|---|

FIG.4B

| CELL 3 | $E_c/I_o$ FOR CELL 3 |
|---|---|

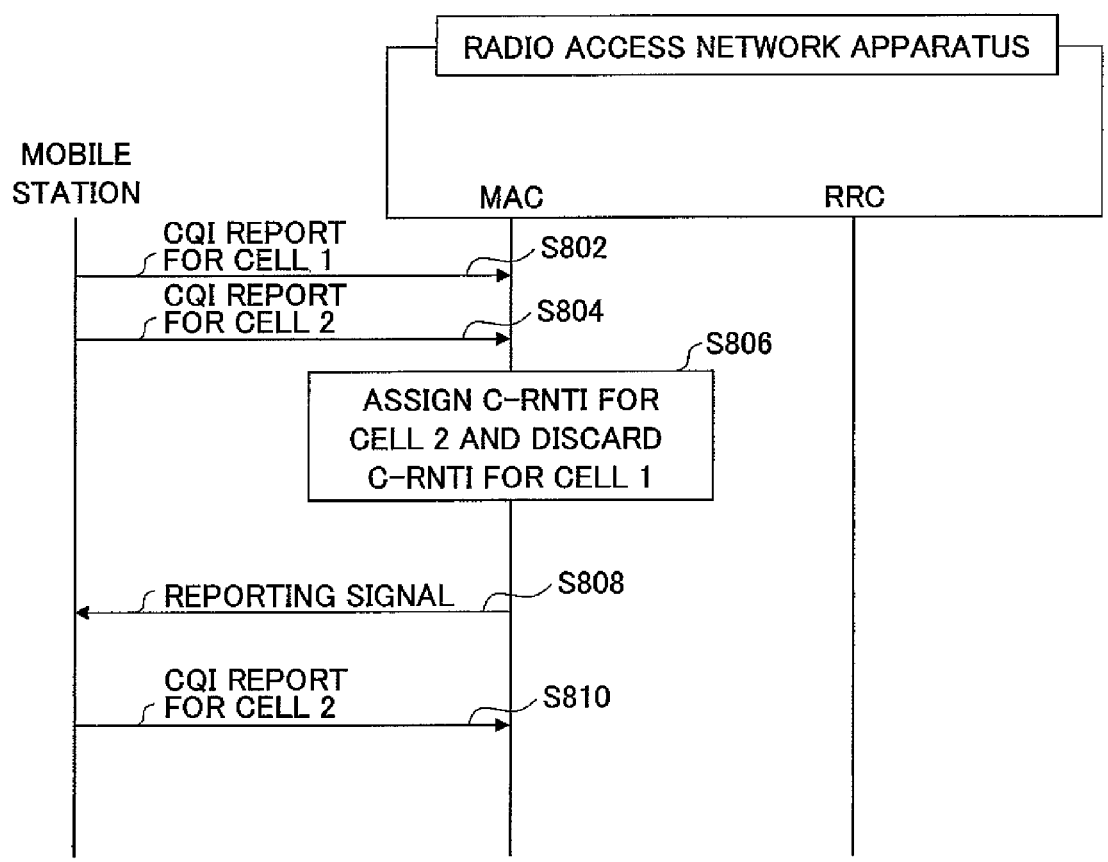

US 8,000,300 B2

MOBILE STATION, RADIO ACCESS NETWORK APPARATUS AND MOBILITY CONTROL METHOD

TECHNICAL FIELD

The present invention relates to mobile stations, radio access network apparatuses and mobility control methods.

BACKGROUND ART

In cellular systems, handover control is carried out for switching between connecting cells in response to a user's traveling. In the handover control, a mobile station evaluates transmission conditions in the connecting cell and adjacent cells, and the handover is activated based on the evaluation.

The term "adjacent cells" used herein includes at least one of four types of cells: cells operated by the same base station apparatus and at the same frequency as the currently connecting cell, cells operated by the same base station apparatus as the currently connecting cell but at a frequency different from the currently connecting cell, cells operated at the same frequency as the currently connecting cell but by a base station apparatus different from the currently connecting cell, and cells operated by a different base station apparatus and at a different frequency from the currently connecting cell. In order to perform the handover to the adjacent cells, mobile stations must evaluate transmission conditions in the connecting cells and the adjacent cells.

In radio communication systems in compliance with HSDPA (High Speed Downlink Packet Access) or other standards, a mobile station frequently transmits radio channel conditions of a connecting cell (referred to as CQI (Channel Quality Indicator) hereinafter) to a MAC (Media Access Control) entity in a connecting base station apparatus for link adaptation to fast fading such as transmission power control and AMC (Adaptive Modulation and Coding). In the HSDPA, for example, a mobile station may measure a ratio of the amount of receiving chip energy to the amount of interference power ($E_c/I_o$) for a common pilot channel transmitted from a base station apparatus and transmit the ratio as the CQI at a period of 2 ms or its integer multiple.

Also, the mobile station may be required to measure the $E_c/I_o$ for the common pilot channel or pathloss in the connecting cell and adjacent cells and transmit the measurements in RRC (Radio Resource Control) periodically. In this case, the mobile station may periodically transmit the measurements to a radio network control apparatus in RRC messages. Also, if a reporting condition is specified in the RRC, the mobile station may compare the reporting condition with the measurements. Then, if the reporting condition is satisfied, the mobile station transmits the satisfaction in RRC messages.

DISCLOSURE OF INVENTION

Problem to be Solved by the Invention

However, the above-mentioned conventional techniques may have some problems as presented below.

In the above-mentioned radio communication systems, reports and instructions associated with the handover are transmitted in the RRC, resulting in a larger amount of processing time in the RRC than the MAC in general. In addition, there is a risk of higher load in RRC entity installed apparatuses.

Thus, the present invention aims to overcome the above-mentioned problems. Specifically, one object of the present invention is to a mobile station, a radio access network apparatus and a mobility control method for decreasing the processing time of the handover control and the load of an RRC entity installed apparatus.

Means for Solving the Problem

In order to overcome the above-mentioned problems, an embodiment of the present invention relates to a mobile station, comprising: a radio channel condition evaluation unit evaluating a radio channel condition; a radio channel condition averaging unit averaging the evaluated radio channel condition over a predefined time period; a radio channel condition threshold storage unit storing a threshold of the radio channel condition and a message type, the threshold and the message type being specified by a radio access network apparatus; a radio channel condition comparison unit comparing the averaged radio channel condition with the threshold; and a radio channel condition reporting unit transmitting an identifier and the radio channel condition for a cell to the radio access network apparatus, the averaged radio channel condition of the cell being greater than or equal to the threshold.

According to the embodiment, although the CQI report for only a connecting cell is conventionally transmitted, the CQI reports for several cells exceeding a threshold can be transmitted. As a result, a portion of mobility control can be fulfilled even in a MAC entity, resulting in faster mobility control and reduced load in an RRC processing apparatus.

Further, an embodiment of the present invention relates to a radio access network apparatus, comprising: a radio channel condition threshold reporting unit transmitting a threshold of a reception level and information indicative of a reporting message type; a communicating cell switch unit instructing a communicating cell to be switched based on a radio channel condition supplied from a mobile station; and a mobile station identifier reporting unit transmitting a mobile station identifier for use in a destination cell based on the radio channel condition supplied from the mobile station.

According to the embodiment, although the CQI report for only a connecting cell is conventionally transmitted, the CQI reports for several cells exceeding a threshold can be transmitted. As a result, the CQI report controlled by a MAC entity can be used to fulfill a portion of mobility control such as cell switching or assignment of mobile station IDs, resulting in faster mobility control and reduced load in an RRC processing apparatus.

Still further, an embodiment of the present invention relates to a mobile communication system including a mobile station and a radio access network apparatus, the mobile station comprising: a radio channel condition evaluation unit evaluating a radio channel condition; a radio channel condition averaging unit averaging the evaluated radio channel condition over a predefined time period; a radio channel condition threshold storage unit storing a threshold of the radio channel condition and a message type, the threshold and the message type being specified by a radio access network apparatus; a radio channel condition comparison unit comparing the averaged radio channel condition with the threshold; and a radio channel condition reporting unit transmitting an identifier and the radio channel condition for a cell to the radio access network apparatus, the averaged radio channel condition of the cell being greater than or equal to the threshold, the radio access network apparatus comprising: a radio channel condition threshold reporting unit transmitting a threshold of a reception level and information indicative of a reporting message type; a communicating cell switch unit instructing a communicating cell to be switched based on a radio channel condition supplied from a mobile station; and a mobile station identifier reporting unit transmitting a mobile station identifier for use in a destination cell based on the radio channel condition supplied from the mobile station.

According to the embodiment, although the CQI report for only a connecting cell is conventionally transmitted, the CQI reports for several cells exceeding a threshold can be transmitted. As a result, the CQI report controlled by a MAC entity can be used to fulfill a portion of mobility control such as cell switching or assignment of mobile station IDs, resulting in faster mobility control and reduced load in an RRC processing apparatus.

Still further, an embodiment of the present invention relates to a mobility control method in a mobile communication system including a mobile station and a radio access network apparatus, the method comprising the steps of: at the mobile station, evaluating a radio channel condition; averaging the evaluated radio channel condition over a predefined time period; storing a threshold of the radio channel condition and a message type, the threshold and the message type being specified by a radio access network apparatus; comparing the averaged radio channel condition with the threshold; and transmitting an identifier and the radio channel condition for a cell to the radio access network apparatus, the averaged radio channel condition of the cell being greater than or equal to the threshold, at the radio access network apparatus, transmitting a threshold of a reception level and information indicative of a reporting message type; instructing a communicating cell to be switched based on a radio channel condition supplied from a mobile station; and transmitting a mobile station identifier for use in a destination cell based on the radio channel condition supplied from the mobile station.

According to the embodiment, although the CQI report for only a connecting cell is conventionally transmitted, the CQI reports for several cells exceeding a threshold can be transmitted. As a result, the CQI report controlled by a MAC entity can be used to fulfill a portion of mobility control such as cell switching or assignment of mobile station IDs, resulting in faster mobility control and reduced load in an RRC processing apparatus.

Advantage of the Invention

According to the embodiments of the present invention, it is possible to provide a mobile station, a radio access network apparatus and a mobility control method that achieve faster cell switching in a portion of a cell switching procedure and reduce load in an RRC processing apparatus.

BRIEF DESCRIPTION OF DRAWINGS

FIG. 3 is a block diagram illustrating a radio channel condition threshold storage unit of the mobile station according to one embodiment of the present invention;

FIG. 4A is a format diagram illustrating a radio channel condition reporting signal of the mobile station according to one embodiment of the present invention;

FIG. 4B is a format diagram illustrating a radio channel condition reporting signal of the mobile station according to one embodiment of the present invention;

FIG. 8B is a flow diagram of switching of a communicating cell between cells within a single radio access network apparatus according to one embodiment of the present invention.

LIST OF REFERENCE SYMBOLS

100: mobile station
200: radio access network apparatus

BEST MODE FOR CARRYING OUT THE INVENTION

Embodiments of the present invention will be described in detail with reference to the accompanying drawings below. Throughout the drawings, identical reference symbols are used for elements having the same functions, and descriptions thereof are not repeated.

Figure 1:
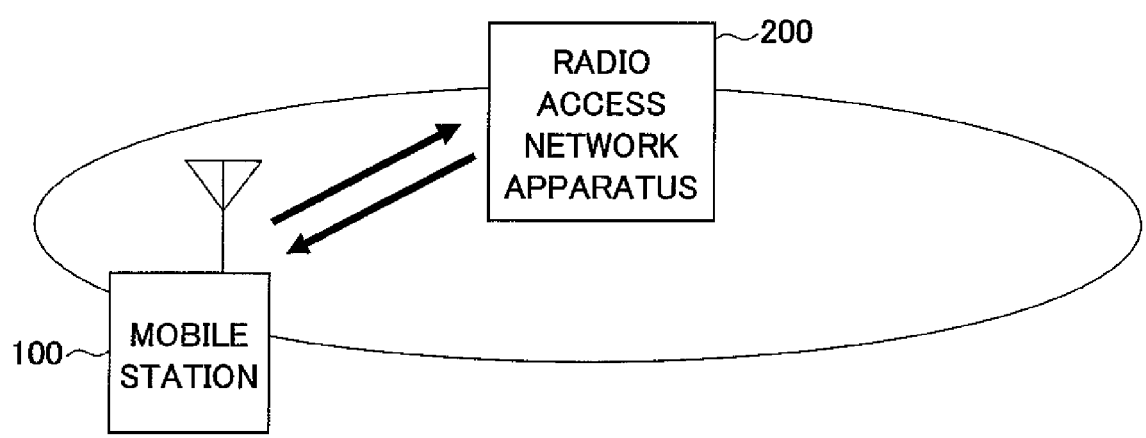
FIG. 1 is a block diagram illustrating a mobile communication system according to one embodiment of the present invention.

A mobile communication system according to one embodiment of the present invention is described with reference to FIG. 1.

In this embodiment, the mobile communication system includes a mobile station 100 and a radio access network apparatus 200.

The mobile station 100 and the radio access network apparatus 200 can communicate with each other at least in shared data channels over the air.

In this embodiment, it is assumed that the radio access network apparatus 200 can have an additional function of a radio base station and communicate with the mobile station 100 directly. In other embodiments, the radio access network apparatus 200 may not serve as a radio base station and communicate with the mobile station 100 via one or more separately installed radio base stations controlled by the radio access network apparatus 200.

Figure 2:
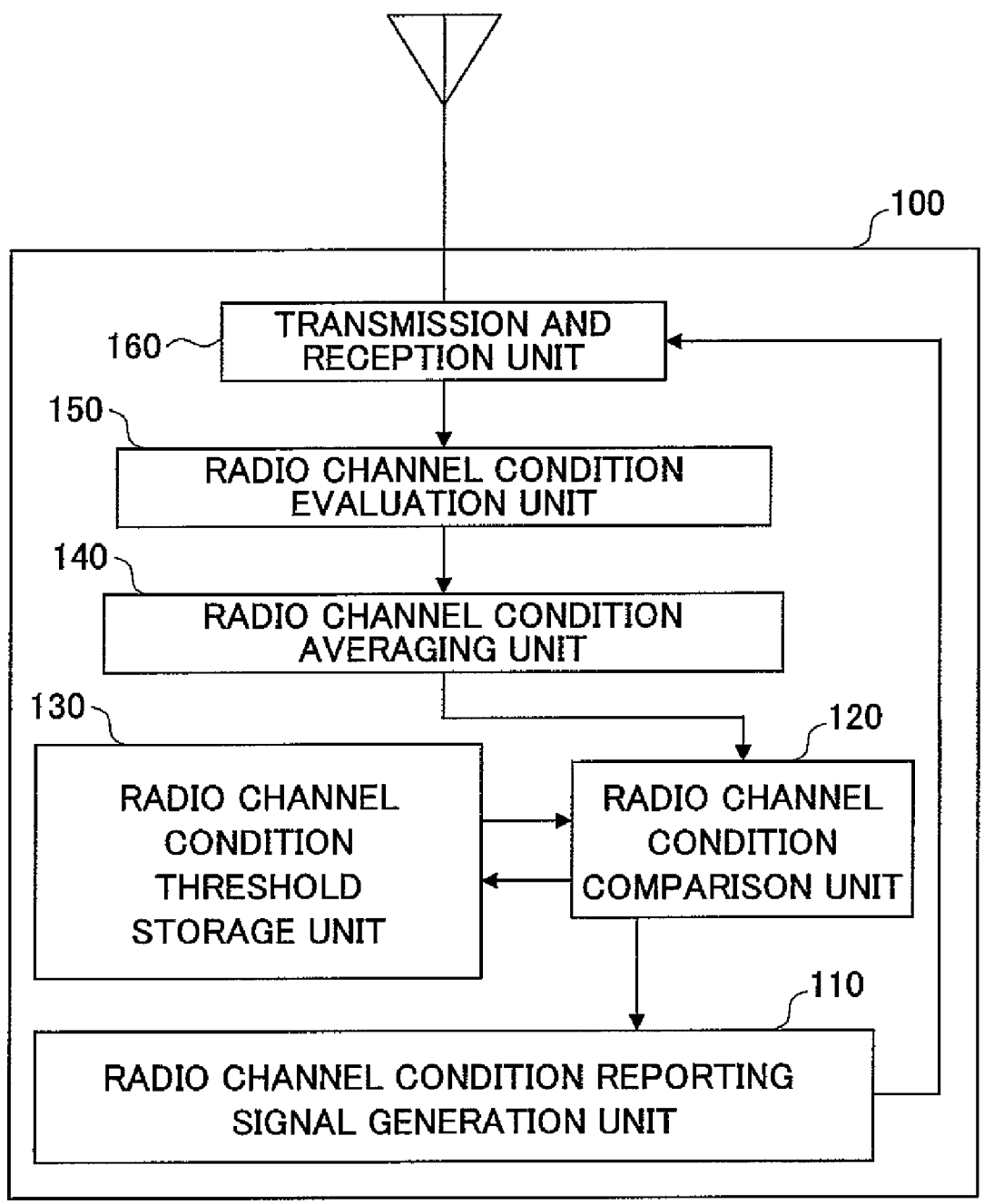
FIG. 2 is a block diagram illustrating a mobile station according to one embodiment of the present invention.

Next, a mobile station 100 according to one embodiment of the present invention is described with reference to FIG. 2.

In this embodiment, the mobile station 100 includes a transmission and reception unit 160, a radio channel condition evaluation unit 150 coupled to the transmission and reception unit 160, a radio channel condition averaging unit 140 coupled to the radio channel condition evaluation unit 150, a radio channel condition comparison unit 120 coupled to the radio channel condition averaging unit 140, a radio channel condition threshold storage unit 130 coupled to the radio channel condition comparison unit 120, and a radio channel condition reporting signal generation unit 110 coupled to the radio channel condition comparison unit 120 and the transmission and reception unit 160.

The radio channel condition evaluation unit 150 evaluates radio channel conditions in a connecting cell and adjacent cells and supplies the evaluated radio channel conditions to the radio channel condition averaging unit 140. In this embodiment, the radio channel conditions may include a CQI, a ratio $E_c/I_O$ for a common pilot channel or pathloss. Also, the adjacent cell may include a cell to which broadcasting information or dedicated control information is transmitted or a cell received by the mobile station 100 as a result of searching.

The radio channel condition averaging unit 140 averages the evaluated radio channel condition over a predefined time period and supplies the averaged radio channel condition to the radio channel condition comparison unit 120.

The radio channel condition threshold storage unit 130 stores some thresholds for the radio channel condition and some reporting message types as specified the radio access network apparatus 200. For example, the radio channel condition threshold storage unit 130 stores a CQI report and a RRC message as the reporting message types. For example, as illustrated in FIG. 3, the radio channel condition threshold storage unit 130 may store a threshold for the reported radio channel condition (reporting thresholds) and a reporting message type for each cell group classified by the radio access network apparatus 200.

The radio channel condition comparison unit 120 compares the averaged radio channel condition supplied from the radio channel condition averaging unit 140 with a radio channel condition threshold specified for the cell group to which the cell corresponding to the evaluated radio channel condition belongs. If the averaged radio channel condition is greater than or equal to the threshold, the radio channel condition comparison unit 120 supplies information indicative of the averaged radio channel condition being greater than or equal to the threshold as well as a reporting message type to the radio channel condition reporting signal generation unit 110. The information indicative of the averaged radio channel condition being greater than or equal to the threshold may be the averaged radio channel information itself supplied to the radio channel condition comparison unit 120.

The radio channel condition reporting signal generation unit 110 generates a reporting signal based on the information and the reporting message type supplied from the radio channel condition comparison unit 120. For example, if there are several types of reporting messages, the radio channel condition reporting signal generation unit 110 may transmit different messages corresponding to the respective message types to the radio access network apparatus 200, as shown in FIGS. 4A and 4B. As shown in FIG. 4A, the radio channel condition reporting signal generation unit 110 may generate a cell identifier such as a cell number as well as information indicative of the CQI for the cell identified by the cell identifier as a CQI report. Also, as shown in FIG. 4B, the radio channel condition reporting signal generation unit 110 may generate a cell identifier and information indicative of the ratio $E_c/I_O$ for the cell identified by the cell identifier as an RRC message such as a measurement report. In this case, an ID assigned for the cell may be used as the cell identifier or the number of scrambling applied to that cell. Depending on the message type specified by the radio access network apparatus 200, a broadcast signal may be transmitted as a MAC control signal such as a CQI report or a RRC control signal such as a measurement report.

Figure 5:
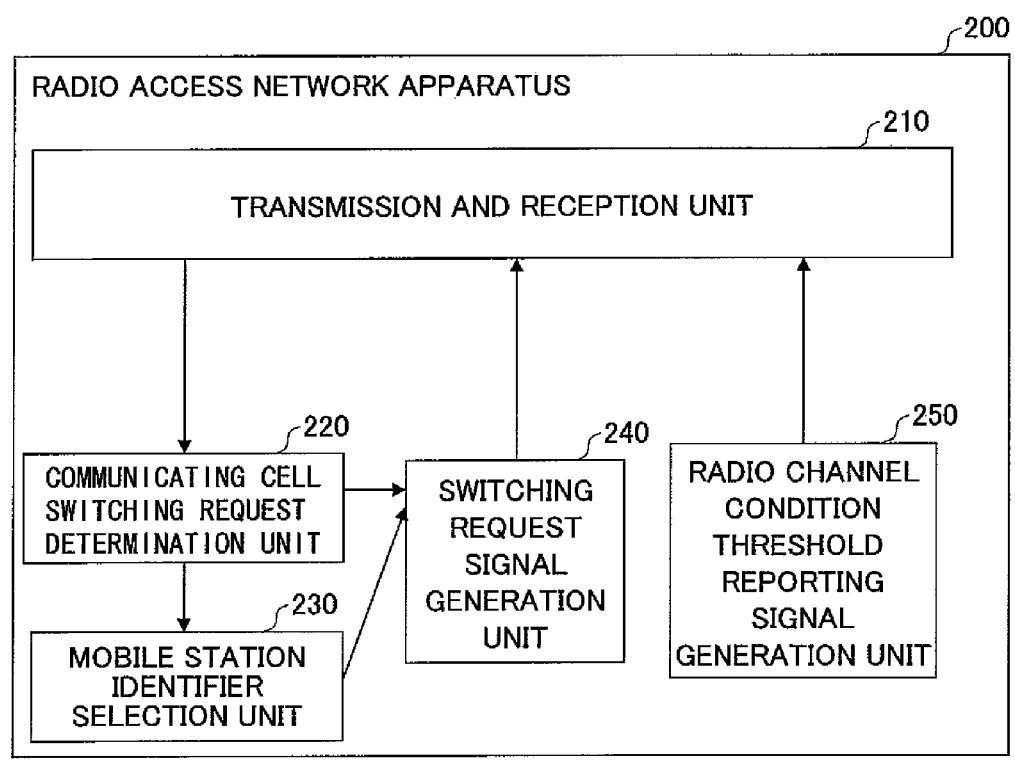
FIG. 5 is a block diagram illustrating a radio access network apparatus according to one embodiment of the present invention.

Next, a radio access network apparatus 200 according to one embodiment of the present invention is described with reference to FIG. 5.

The radio access network apparatus 200 includes a transmission and reception unit 210, a radio channel condition threshold reporting signal generation unit 250 coupled to the transmission and reception unit 210, a communicating cell switching request determination unit 220 coupled to the transmission and reception unit 210, a mobile station identifier selection unit 230 coupled to the communicating cell switching request determination unit 220, and a switching request signal generation unit 240 coupled to the communicating cell switching request determination unit 220, the mobile station identifier selection unit 230 and the transmission and reception unit 210.

The communicating cell switching request determination unit 220 determines whether a communicating cell must be switched based on a radio channel condition supplied from the mobile station 100. This determination maybe made for a single reported radio channel condition. Alternatively, only if the radio channel condition is successively transmitted several times, it may be determined that the communicating cell should be switched. Such various communicating cell switching conditions may be defined in the radio access network apparatus 200.

The mobile station identifier selection unit 230 selects an identifier of the mobile station 100 to be used in a new cell if the communicating cell switching request determination unit 220 determines that the communicating cell must be switched. Different entities may be used to select the identifier of the mobile station 100 depending on the message type supplied from the mobile station 100. For example, while a MAC entity may select the mobile station identifier for CQI reports, an RRC entity may select the mobile station identifier in cases of reporting in RRC messages. Also, if the RRC entity selects the mobile station identifier, the mobile station identifier used by the MAC entity may be included in a part of the RRC message.

The switching request signal generation unit 240 generates information associated with the communicating cell switching determined by the communicating cell switching request determination unit 220 as well as messages for transmitting the mobile station identifier selected by the mobile station identifier selection unit 230 to the associated mobile station 100 if new cells are specified.

The radio channel condition threshold reporting signal generation unit 250 generates signals for transmitting thresholds for comparison to the radio channel condition evaluated in the mobile station 100. The radio channel condition threshold reporting signal generation unit 250 may define different thresholds for different cell groups consisting of one or more cells. The respective cell groups may be separated depending on different radio access network apparatuses 200, the connecting frequency and other frequencies or the same frequency of the same radio access network apparatus and others.

Figure 6:
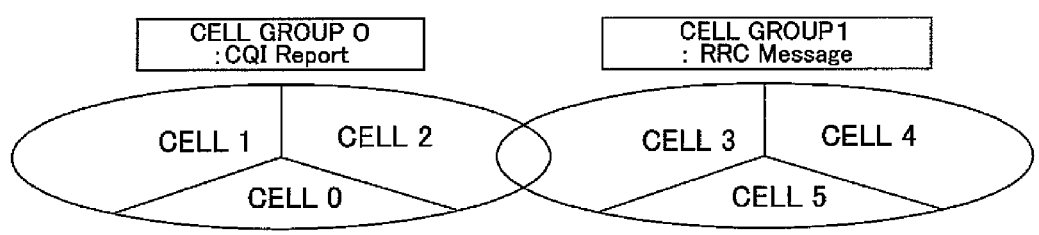
FIG. 6 shows a cell configuration according to one embodiment of the present invention.

For example, as shown in FIG. 6, the cells are classified into cell group 0 and cell group 1, the cell group 0 including cells 0-2 and the cell group 1 including cells 3-5.

In this case, if the cell groups are grouped based on the same frequency in the same radio access network apparatus and the others, the radio channel condition threshold reporting signal generation unit 250 can generate threshold reporting signals as described with reference to FIG. 3. As the message type, for example, the CQI report is applied to the cell group 0 while the RRC message is applied to the cell group 1.

Figure 7:
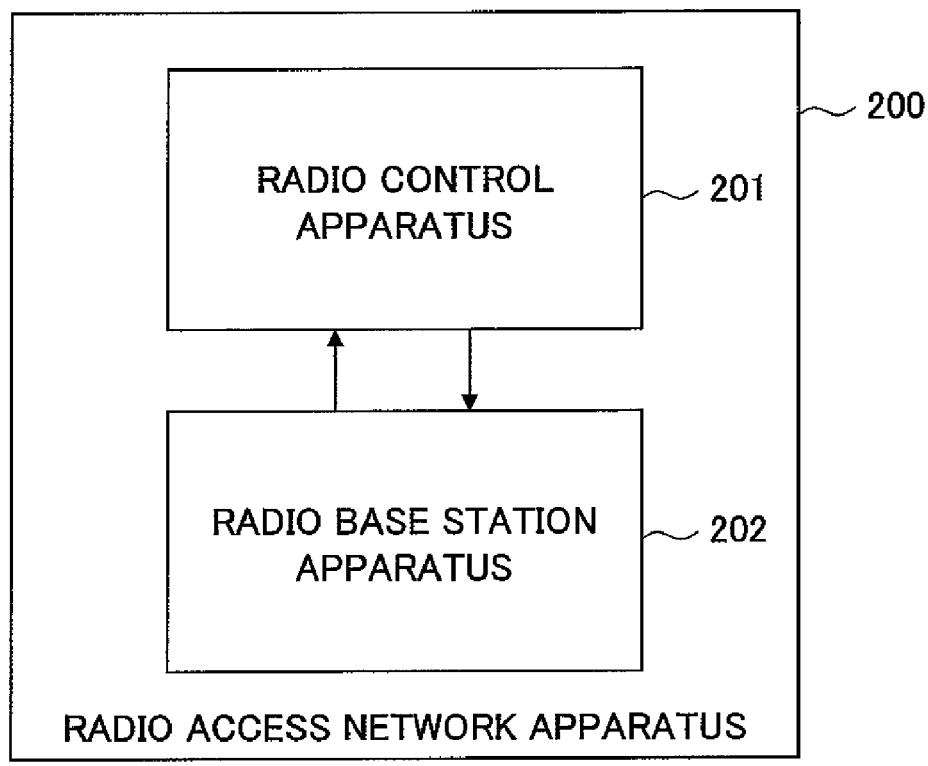
FIG. 7 is a block diagram illustrating a radio access network apparatus according to one embodiment of the present invention.

The radio access network apparatus 200 of this embodiment may be implemented with a radio control apparatus 201 and a radio base station apparatus 202 as shown in FIG. 7.

In the above-mentioned embodiments, it is assumed that the radio access network apparatus 200 has the both functions of the radio control apparatus 201 and the radio base station apparatus 202. On the other hand, the radio control apparatus 201 and the radio base station apparatus 202 maybe installed separately from each other, but it is preferred that the radio control apparatus 201 and the radio base station apparatus 202 be accommodated together within a single apparatus from the viewpoint of reduction in delay involved in data transmission.

Next, an exemplary cell change sequence between cells within a single radio access network apparatus in a mobile communication system according to one embodiment of the present invention is described with reference to FIGS. 8A and 8B.

Figure 8A:
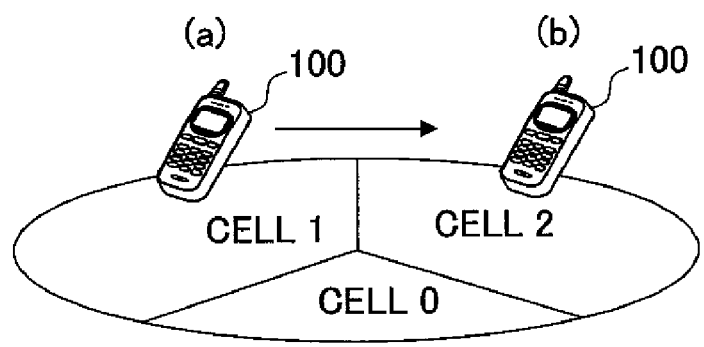
FIG. 8A is a schematic view of switching of a communicating cell between cells within a single radio access network apparatus according to one embodiment of the present invention.

When the mobile station 100 communicates at the position (a) in FIG. 8A, only the radio channel condition in the cell 1 exceeds a threshold specified by the radio access network apparatus 200, and accordingly the radio channel condition reporting signal generation unit 110 only transmits the CQI for the cell 1 to the radio access network apparatus 200 at step S802.

Then, the mobile station 100 moves to the position (b) in FIG. 8A, and if only the radio channel condition in the cell 2 exceeds the threshold specified by the radio access network apparatus 200, the radio channel condition reporting signal generation unit 110 only transmits the CQI for the cell 2 to the radio access network apparatus 200 at step S804.

Since the CQI report from the cell 2 is new, the mobile station identifier selection unit 230 of the radio access network apparatus 200 assigns a mobile station identifier or C-RNTI (Cell Specific Radio Network Temporary Identifier) for use in the cell 2 for the mobile station 100 in MAC. Also, since no CQI report is received from the cell 1, the communicating cell switching request determination unit 220 instructs the mobile station 100 to discard a mobile station identifier used in the cell 1 by the mobile station 100 at step S806.

The switching request signal generation unit 240 of the radio access network apparatus 200 informs the mobile station 100 in MAC that the mobile station identifier (C-RNTI) of the mobile station 100 for use in the cell 2 has been assigned and the mobile station identifier used in the cell 1 by the mobile station 100 has been discarded at step S808.

Since the mobile station identifier for use in the cell 2 has been assigned for the mobile station 100, the mobile station 100 can subsequently communicate in the cell 2. If only the radio channel condition in the cell 2 exceeds the threshold specified by the radio access network apparatus 200, the mobile station 100 uses the radio channel condition reporting signal generation unit 110 to transmit only the CQI for the cell 2 to the radio access network apparatus 200 at step S810.

According to the above embodiments, when a mobile station travels across cells within a single radio access network apparatus, cell change instructions and mobile station identifiers for use in destination cells can be assigned in MAC without exchanging of any message in RRC. Thus, it is possible to reduce the processing time involved in the cell change and the load in RRC within the radio access network apparatus.

This international patent application is based on Japanese Priority Application No. 2006-037288 filed on Feb. 14, 2006, the entire contents of which are hereby incorporated by reference.

INDUSTRIAL APPLICABILITY

A mobile station, a radio access network apparatus and a mobility control method according to the present invention can be applied to radio communication systems.

The invention claimed is:

1. A mobile station, comprising:
   a radio channel condition evaluation unit evaluating radio channel conditions of one or more cells;
   a radio channel condition averaging unit averaging the evaluated radio channel condition over a predefined time period;
   a radio channel condition threshold storage unit storing thresholds of the radio channel conditions and message types in association with the cells, the thresholds and the message types being specified by a radio access network apparatus;
   a radio channel condition comparison unit comparing the averaged radio channel conditions for the cells with the thresholds associated with the cells;
   a radio channel condition reporting unit, if the averaged radio channel condition of any of the cells is greater than or equal to the threshold associated with the cell, generating a message of the message type associated with the cell, the message including a cell identifier and the radio channel condition of the cell and transmitting the generated message to the radio access network apparatus;
   the message types include a RRC (Radio Resource Control) message type and a MAC (Media Access Control) message type; and
   the RRC message type of messages and the MAC message type of messages are processed by a RRC entity and a MAC entity, respectively, in the mobile station.

2. The mobile station as claimed in claim 1, wherein the radio channel condition evaluation unit evaluates the radio channel condition of a connecting cell and an adjacent cell.

3. The mobile station as claimed in claim 1, wherein the thresholds are associated with respective cell groups, each including one or more of the cells, configured by the radio access network apparatus.

4. The mobile station as claimed in claim 3, wherein the radio channel condition reporting unit reports the radio channel conditions of respective cell groups configured by the radio access network apparatus in different messages.

5. A radio access network apparatus, comprising:
   a radio channel condition threshold reporting unit transmitting thresholds of radio channel conditions of one or more cells and message types in association with the cells;
   a communicating cell switch unit instructing a mobile station to handover from a communicating cell to a target cell based on the radio channel conditions of the cells supplied from the mobile station; and
   a mobile station identifier reporting unit transmitting a mobile station identifier for use in the target cell to the mobile station based on the radio channel condition supplied from the mobile station, wherein
   the message types include a RRC (Radio Resource Control) message type and a MAC (Media Access Control) message type; and
   the RRC message type of messages and the MAC message type of messages are processed by a RRC entity and a MAC entity, respectively, in the radio access network apparatus.

6. The radio access network apparatus as claimed in claim 5, wherein the thresholds are associated with respective cell groups each including one or more of the cells.

7. A mobile communication system including a mobile station and a radio access network apparatus,
   the mobile station comprising:
   a radio channel condition evaluation unit evaluating a radio channel conditions of one or more cells;

a radio channel condition averaging unit averaging the evaluated radio channel condition over a predefined time period;

a radio channel condition threshold storage unit storing thresholds of the radio channel conditions and message types in association with the cells, the thresholds and the message types being specified by a radio access network apparatus;

a radio channel condition comparison unit comparing the averaged radio channel conditions for the cells with the thresholds associated with the cells; and a radio channel condition reporting unit, if the averaged radio channel condition of any of the cells is greater than or equal to the threshold associated with the cell, generating a message of the message type associated with the cell, the message including a cell identifier and the radio channel condition of the cell, and transmitting the generated message to the radio access network apparatus, the radio access network apparatus comprising:

a radio channel condition threshold reporting unit transmitting thresholds of radio channel conditions of one or more cells and message types in association with the cells;

a communicating cell switch unit instructing a mobile station to handover from a communicating cell to a target cell based on the radio channel conditions of the cells supplied from the mobile station; and a mobile station identifier reporting unit transmitting a mobile station identifier for use in the target cell to the mobile station based on the radio channel condition supplied from the mobile station, wherein the message types include a RRC (Radio Resource Control) message type and a MAC (Media Access Control) message type; and the RRC message type of messages and the MAC message type of messages are processed by RRC entities and MAC entities, respectively, in the mobile station and the radio access network apparatus.

8. A mobility control method in a mobile communication system including a mobile station and a radio access network apparatus, the method comprising the steps of:

at the mobile station, evaluating a radio channel conditions of one or more cells;

averaging the evaluated radio channel condition over a predefined time period;

storing thresholds of the radio channel conditions and message types in association with the cells, the thresholds and the message types being specified by a radio access network apparatus;

comparing the averaged radio channel conditions for the cells with the thresholds associated with the cells; and if the averaged radio channel condition of any of the cells is greater than or equal to the threshold associated with the cell, generating a message of the message type associated with the cell, the message including a cell identifier and the radio channel condition of the cell, and transmitting the generated message to the radio access network apparatus, at the radio access network apparatus, transmitting a threshold of radio channel conditions of one or more cells and message types in association with the cells;

instructing a mobile station to handover from a communicating cell to a target cell based on the radio channel conditions of the cells supplied from the mobile station; and transmitting a mobile station identifier for use in the target cell to the mobile station based on the radio channel condition supplied from the mobile station, wherein the message types include a RRC (Radio Resource Control) message type and a MAC (Media Access Control) message type; and the RRC message type of messages and the MAC message type of messages are processed by RRC entities and MAC entities, respectively, in the mobile station and the radio access network apparatus.

* * * * *